US012519269B2

(12) United States Patent
Panitz et al.

(10) Patent No.: US 12,519,269 B2
(45) Date of Patent: Jan. 6, 2026

(54) HOUSING ASSEMBLY FOR AN ELECTRICAL CONNECTOR AS WELL AS ELECTRICAL CONNECTOR AND CONNECTOR ASSEMBLY

(71) Applicant: TE Connectivity Germany GmbH, Bensheim (DE)

(72) Inventors: Gregor Panitz, Bensheim (DE); Harald Ulrich, Bensheim (DE); Christoph Kosmalski, Bensheim (DE); Kevin Scheer, Bensheim (DE); Maximilian Veihl, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 294 days.

(21) Appl. No.: 18/470,865

(22) Filed: Sep. 20, 2023

(65) Prior Publication Data

US 2024/0106165 A1 Mar. 28, 2024

(30) Foreign Application Priority Data

Sep. 22, 2022 (DE) ......................... 102022124324.9

(51) Int. Cl.
*H01R 13/629* (2006.01)
*H01R 13/62* (2006.01)

(52) U.S. Cl.
CPC ....... *H01R 13/629* (2013.01); *H01R 13/6205* (2013.01)

(58) Field of Classification Search
CPC .............. H01R 13/629; H01R 13/6205; H01R 13/62905; H01R 13/62927; H01R 13/62933; H01R 13/62994; H01R 13/639
(Continued)

(56) References Cited

U.S. PATENT DOCUMENTS 5,738,537 A * 4/1998 Setoguchi ............. G06F 1/1632 439/928.1
6,123,575 A * 9/2000 Huang ............... H01R 13/6273 439/352
(Continued)

FOREIGN PATENT DOCUMENTS

WO 2019179990 A1 9/2019

OTHER PUBLICATIONS

Search Report for corresponding DE Application No. 102022124324.9 dated Jul. 24, 2023 (6 pages).

*Primary Examiner* — Harshad C Patel
(74) *Attorney, Agent, or Firm* — Jay J. Hoette; The Small Patent Law Group, LLC

(57) ABSTRACT

The present invention relates to a housing assembly for an electrical connector which is pluggable with a mating connector, comprising a manually movable operating element for connecting the electrical connector to the mating connector, a connector housing at which the operating element is arranged to be movable between an initial position and a final position, a securing element which is movable between a release position and a secured position, and a trigger mechanism which holds the securing element in the release position pre-stressed in the direction of the secured position, where the trigger mechanism is activated in the final position of the operating element, and the securing element is movable to the secured position, whereby the operating element is securable in the final position. Due to the trigger mechanism, the securing element can be automatically transferred from its release position to its secured position solely by moving the operating element to the final position and does not require any manual operation. The present invention furthermore relates to an electrical connector with such a
(Continued)

housing assembly and a connector assembly with the electrical connector and the mating connector.

20 Claims, 4 Drawing Sheets

(58) Field of Classification Search
USPC .......................................................... 439/39
See application file for complete search history.

(56) References Cited

U.S. PATENT DOCUMENTS

| | | | | | |
|---|---|---|---|---|---|
| 6,146,210 | A * | 11/2000 | Cha | H01R 13/642 | 439/353 |
| 7,238,039 | B2 * | 7/2007 | Holweg | H01R 13/6273 | 439/352 |
| 8,968,021 | B1 * | 3/2015 | Kennedy | H01R 13/641 | 439/352 |
| 9,252,532 | B2 * | 2/2016 | Riedel | H01R 25/14 | |
| 9,356,394 | B2 * | 5/2016 | Kennedy | H01R 24/38 | |
| 9,515,418 | B2 * | 12/2016 | Yoshizawa | B60K 1/04 | |
| 10,236,640 | B2 * | 3/2019 | Pamart | H01R 13/71 | |
| 11,444,413 | B2 * | 9/2022 | Poemmerl | H01R 13/641 | |
| 11,699,885 | B1 * | 7/2023 | Pavlovic | H01R 13/6581 | 235/451 |
| 2009/0221154 | A1 * | 9/2009 | Hartlef | H01R 13/6315 | 439/39 |
| 2020/0412058 | A1 | 12/2020 | Poemmerl | | |
| 2021/0265778 | A1 * | 8/2021 | Panitz | H01R 13/62905 | |

* cited by examiner

HOUSING ASSEMBLY FOR AN ELECTRICAL CONNECTOR AS WELL AS ELECTRICAL CONNECTOR AND CONNECTOR ASSEMBLY

CROSS-REFERENCE TO RELATED APPLICATIONS

This application claims the benefit of U.S. Provisional Application No. 102022124324.9, filed 22 Sep. 2022, the subject matter of which is herein incorporated by reference in its entirety.

BACKGROUND OF THE INVENTION

The present invention relates to a housing assembly for an electrical connector, for example, but not exclusively, for automotive and/or energy technology applications. The present invention furthermore relates to an electrical connector with such a housing assembly as well as to a connector assembly with such an electrical connector. For the purpose of transmitting electrical currents and/or signals in electric circuits, electrical connectors for detachable plug connections are used between components that are part of the circuit.

In order to establish or release the respective plug connection, firstly, considerable resistance forces often have to be overcome during a plugging process. Secondly, restricted accessibility of the electrical connector can make the plugging process more difficult. In order to facilitate assembly of the plug connection, the use of a plugging aid for mechanical assistance for the plugging process is advisable. The plugging aid is typically operated manually by the assembly staff.

Furthermore, when establishing the plug connection, care must be taken to ensure that the plugging process is carried out correctly and completely. For this purpose, a so-called CPA element (CPA=connector position assurance) can be provided which can only be operated after the plugging process has been fully completed. Upon operation, the CPA element can prevent the plug connection from being released accidentally. However, operating the CPA element requires an additional manual operation which is often repeated, in particular in assembly line production, and consequently affects overall productivity.

Overall, there is a need for plug connections that can be operated easily and effectively with as few manual interventions as possible.

BRIEF DESCRIPTION OF THE INVENTION

The present invention is therefore based on the object of providing a plug connection that can be established safely and without great effort.

This object is satisfied by a housing assembly for an electrical connector which is pluggable with a mating connector along a plugging direction, comprising a manually movable operating element for connecting the electrical connector to the mating connector, a connector housing at which the operating element is arranged to be movable between an initial position and a final position, a securing element which is movable between a release position and a secured position, and a trigger mechanism which holds the securing element in the release position pre-stressed in the direction of the secured position, where the trigger mechanism is activated in the final position of the operating element and the securing element is movable to the secured position, whereby the operating element is securable in the final position.

The present invention is advantageous because the securing element can be automatically transferred from the release position to the secured position, differing therefrom, solely by the pre-stress of the trigger mechanism and the movement of the operating element to the final position and does not itself have to be operated manually. This saves a manual step for every plugging process. In particular, the trigger mechanism is activated, triggered or addressed automatically as part of a manual step, which must be carried out anyway, in order to move the operating element from the initial position to the final position differing therefrom. The pre-stress of the trigger mechanism is then converted into a motion of the securing element from the release position to the secured position. As a result, after the activation of the trigger mechanism, the securing element is moved automatically to the secured position.

The securing element can therefore function as an automatically operable CPA element and secure the connection of the electrical connector with the mating connector. In other words, the securing element can fulfill the function of a connector position assurance which ensures that a fully plugged state is given and is maintained between the electrical connector and mating connector.

The connection between the electrical connector and the mating connector is preferably a mechanical connection. The operating element can there be configured as a plugging aid that effects, drives, supports, simplifies or establishes the connection between the electrical connector and the mating connector.

The invention can be further improved by the following embodiments which are advantageous by themselves and which may be combined with one another at random.

The operating element disposed in the final position is securable directly or indirectly by the securing element disposed in the secured position. This means that the operating element and the secured position can engage directly with each other. Alternatively, the operating element and the securing element can indirectly be in a mechanical operative connection via the connector housing, via the remainder of the electrical connector, or via the mating connector. This shall be explained in more detail hereafter:

According to a possible embodiment of the invention in a compact design, the securing element can be part of the trigger mechanism. Furthermore, the securing element can be moved by the operating element from the release position to the final position. For example, the securing element can be configured in the release position to be latchable to the connector housing or the operating element via the trigger mechanism, where this latching can be released by moving the operating element to the final position. Due to the pre-stress of the securing element by the trigger mechanism, the securing element is moved from the release position to the secured position once the latching is released.

A latching that can be easily implemented arises when the securing element comprises a deflectable latching section, where the connector housing or the operating element comprise a latching edge, where the latching section abuts against the latching edge when the securing element is disposed in the release position and the operating element in is disposed in the initial position, and where the latching section can be deflected away from the latching edge by the connector housing or the operating element when the securing element is disposed in the release position and the operating element is disposed in the final position. The latching edge can be arranged on the outside of the connector housing or operating element. The latching section is deflectable preferably in an elastic and non-destructive manner. For this purpose, the latching section is more flexible in terms of its shape and material properties than the remainder of the securing element. If repeatability is not intended or can even be ruled out, then the latching section can also be deflected plastically and with permanent deformation.

Alternatively, the latching section itself can also be rigid and not deflectable. The rigid latching section abuts in flush alignment against the latching edge when the securing element is disposed in the release position and the operating element is disposed in the initial position. By tilting or sliding the entire securing element, the rigid latching section is moved out of alignment with the latching edge when the securing element is disposed in the release position and the operating element in the final position. The tilting or sliding of the securing element can be caused by the connector housing or the operating element. In order to ensure that the securing element has the correct alignment after tilting or sliding to the secured position, for example, a return spring can be provided which resets the tilting or sliding, at the latest when the securing element has reached the secured position.

Optionally, the securing element can also be configured to be latchable in the secured position to the connector housing or the operating element. This latching preferably creates a latching noise, which serves as an acoustic assembly control.

The operating element can comprise at least one drive section that can be made to engage with the mating connector. The at least one drive section serves to move the mating connector into a state that is fully plugged with the electrical connector when the operating element is moved from the initial position to the final position.

For example, the drive section can be accessible to the mating connector in the initial position of the operating element. Furthermore, the drive section can be configured to carry out a drive motion when the operating element is transferred from the initial position to the final position. This drive motion can be used to move the mating connector to the state fully plugged with the electrical connector.

According to a more specific embodiment of the invention, the operating element can be configured as a control slide which is arranged to be slidable on the connector housing. The control slide is preferably held on the connector housing to be slidable transverse to the plugging direction, in particular perpendicular to the plugging direction. The control slide can then simplify the plugging process if, for example, the electrical connector is difficult to access from the plugging direction. In such cases, the control slide can be pressed from a direction from which the electrical connector is better accessible. The pushing force on the at least one drive section is converted into a force acting in the plugging direction, which drives the plugging process.

Alternatively, the operating element can be configured as a control lever arranged to be pivotable at the connector housing. The resulting leverage advantageously reduces the force required to operate the operating element. The at least one drive section can there form part of a link guide or a gear, for example, a sprocket segment.

The trigger mechanism is preferably activated by a free end of the control lever pointing away from the connector housing when the securing element is disposed in the release position and the control lever in the final position. In particular, the latching section already described is deflected away from the latching edge by the free end of the control lever. The free end of the control lever carries out the largest stroke motion and is therefore particularly suitable for activating the trigger mechanism. Of course, any other region of the control lever (for example a lateral lever arm connecting the free end to the connector housing) can also activate the trigger mechanism.

According to a further possible embodiment, the securing element can be movable by a translation between the release position and the secured position. In particular, the securing element can be configured as a slide. This embodiment is advantageous because the housing assembly can be easily sealed with a securing element configured as a slide.

Alternatively or additionally, the securing element can be movable by rotation between the release position and the secured position. In particular, the securing element can be configured as a rocker. In comparison to the securing element configured as a slide, the securing element configured as a rocker requires less space along a single spatial direction.

Handling the housing assembly can be simplified in that the securing element is guided at least in sections in or at the connector housing. Likewise, the securing element can be guided in or at the operating element. Furthermore, the securing element can be movable with and relative to the operating element or connector housing. For example, the operating element or the connector housing can comprise at least one groove into which the securing element is inserted and guided at least in sections.

Additional space saving arises if the connector housing or the operating element is penetrated by the securing element at least in sections. For example, the connector housing or the operating element can comprise at least one channel-shaped guide into which the securing element is plugged at least in sections.

According to a further possible embodiment of the invention, the connector housing can comprise a housing part which forms, shapes, confines or defines a plugging receptacle for receiving a plugging face of the mating connector. The securing element disposed in the secured position preferably projects at least in part into the plugging receptacle. In particular, the securing element projects further into the plugging receptacle in the secured position than in the release position. The securing element can therefore be made to engage with the mating connector, in particular with the plugging face of the mating connector, provided that the electrical connector and the mating connector are in the fully plugged state.

If the securing element reaches the secured position prematurely (e.g. for that the trigger mechanism was activated accidentally), then the securing element protruding into the plugging receptacle can block the plugging receptacle and thus prevent the electrical connector and the mating connector from being plugged together.

Alternatively, the plugging face can also be arranged at the connector housing and the plugging receptacle at the mating connector.

As shall be explained in more detail with regard to the connector assembly according to the invention, the securing element can interact with an electrical control system of the connector assembly. For this purpose, the securing element can comprise an electrically conductive section. Additionally or alternatively, the securing element can comprise a magnetic section. The magnetic section is preferably permanent-magnetic or ferromagnetic. The electrically conductive section and/or the magnetic section protrude into the plugging receptacle when the securing element is disposed in the secured position.

The trigger mechanism can comprise a spring element with which the securing element in the release position is pre-stressed in the direction of the secured position. The spring element preferably sits on the securing element. Furthermore, the spring element is arranged subject to pre-stress by tension or pressure between the securing element disposed in the release position and the connector housing or the operating element. The spring element can be, for example, a coil spring and/or leaf spring.

According to a compact embodiment with a small number of components, the spring element can form the electrically conductive section already mentioned. In other words, the electrically conductive section can represent at least part of the spring element.

According to a further possible embodiment, the securing element, in particular the latching section of the securing element, can protrude at least in part out from the connector housing when the securing element is disposed in the release position and the operating element in the initial position. The securing element, in particular the latching section of the securing element, is therefore easily accessible to the operating element for the purpose of activating the trigger mechanism.

In order to prevent faulty activation of the trigger mechanism due to unwanted contact, the housing assembly can comprise a collar, a cage, or a wall. The collar can there surround at least in sections the securing element protruding out from the connector housing. In particular, the collar surrounds the securing element such that the latching section of the securing element is accessible to the operating element.

The underlying object mentioned at the outset can furthermore be satisfied by an electrical connector with a housing assembly according to one of the preceding embodiments, where at least one electrical contact element is arranged in the connector housing. The at least one electrical contact element can be configured to establish contact with a mating contact of the mating connector and allows for the electrical connector to be used for a detachable plug connection for the transmission of electrical currents and/or signals. Due to the functionality and advantages of the housing assembly already explained, the electrical connector according to the invention can also be advantageously operated with little effort.

Depending on the field of application of the electrical connector, several contact elements can optionally be arranged in the connector housing. This expands the applicability of the electrical connector.

The object mentioned at the outset can also be satisfied by a connector assembly comprising an electrical connector according to one of the preceding embodiments and a mating connector configured to be pluggable with the electrical connector, where the securing element can be made to engage with the mating connector when the securing element is disposed in the secured position and the mating connector in the state plugged together with the electrical connector.

The connector assembly according to the invention likewise benefits from the advantages of the housing assembly. In particular, due to the interaction between the securing element, the operating element, and the trigger mechanism, the securing element does not need to be operated manually for reaching the secured position in which the securing element fulfills the position assurance of the mating connector.

According to an embodiment that is easy to produce and reliable, the securing element can comprise a locking section and the mating connector can comprise a recess which is shaped to be complementary to the locking section. The locking section can protrude transverse to the plugging direction, in particular perpendicular to the plugging direction. The recess complementary thereto extends accordingly transverse, in particular perpendicular, to the plugging direction. Furthermore, the locking section and the recess can engage with one another when the securing element is disposed in the secured position and the mating connector is disposed in the state plugged together with the electrical connector.

According to a possible embodiment of the connector assembly, the mating connector can comprise at least one output section arranged such that it can made to engage with the at least one drive section of the operating element. The at least one output section can be configured, for example, as part of a link guide or a gear, for example, as a rack segment.

As part of the plugging process, the at least one drive section of the operating element and the at least one output section of the mating connector are made to engage. This engagement remains as long as the mating connector is disposed in the state plugged together with the electrical connector. During the engagement, the operating element and the mating connector are in a mechanical operative connection, so that they cannot be moved independently of one another. Due to this mechanical operative connection, the operating element is indirectly secured by the securing element when the securing element is disposed in the secured position and fulfills the position assurance of the mating connector.

As already indicated, the electrical safety of the connector assembly can be improved by providing an electrical control system. The electrical control system ensures that the main circuit (i.e. the circuit that leads over the at least one electrical contact element of the electrical connector) can only be switched on when the mating connector is in a state fully plugged/together with the electrical connector.

For this purpose, the mating connector can comprise an open monitoring circuit. In particular, two contacts of the monitoring circuit can be arranged to be accessible, in particular exposed, on the plugging face of the mating connector. The monitoring circuit can be, for example, part of a high-voltage interlock system, a high-voltage interlock loop, or an HVIL detection device (HVIL=high voltage interlock loop). The high-voltage interlock system can in turn be configured such that the main circuit can only be put into operation when the monitoring circuit is closed.

For closing the monitoring circuit, the securing element can comprise a contact bridge which forms the electrically conductive section already mentioned of the securing element. The contact bridge is arranged on the securing element such that it closes the monitoring circuit when the securing element is disposed in the secured position and the mating connector is disposed in the state plugged together with the electrical connector. In particular, the contact bridge shorts the two contacts of the monitoring circuit when the securing element is disposed in the secured position and the mating connector is disposed in the state plugged together with the electrical connector.

In order to ensure sufficient contacting force when shorting the two contacts of the monitoring circuit, the contact bridge can be held pre-stressed in the securing element, in particular pre-stressed transverse, preferably perpendicular, to the direction of motion of the securing element. Alternatively or additionally, the two contacts of the monitoring circuit can be configured as spring contact pins (so-called pogo pins). T According to an alternative embodiment of the connector assembly with the control system, the mating connector can comprise a magnetic sensor, for example, a reed switch. The securing element can accordingly comprise a magnet, in particular a permanent magnet, which forms the magnetic section of the securing element. The magnet is arranged at the securing element such that it is in flush alignment with the magnetic sensor, in particular in flush alignment in the plugging direction, when the securing element is disposed in the secured position and the mating connector is disposed in the state plugged together with the electrical connector. The control system can therefore be configured to release the main circuit only when the magnetic field of the magnet is detected by the magnetic sensor.

This embodiment is suitable for use in environments in which contamination from metal chips or electrically conductive liquids could inadvertently short-circuit the exposed contacts of the monitoring circuit.

The invention shall be explained hereafter in more detail with reference to the drawings on the basis of several embodiments, the different features of which may be combined with one another as required in accordance with the above observations. In particular, individual features can be added to the described embodiments in accordance with the above explanations if the effect of these features is necessary for a specific application. Conversely, individual features can be omitted from the existing embodiments if the technical effect of these features is not important in a specific application. Similar, identical, and functionally identical elements in the drawings are provided with the same reference numerals to the extent as appropriate.

DETAILED DESCRIPTION OF THE INVENTION

With reference to FIGS. 1 to 6, the schematic structure of a housing assembly 1 according to the invention, of an electrical connector 2 according to the invention, as well as of a connector assembly 4 according to the invention shall be explained hereafter.

Figure 1:
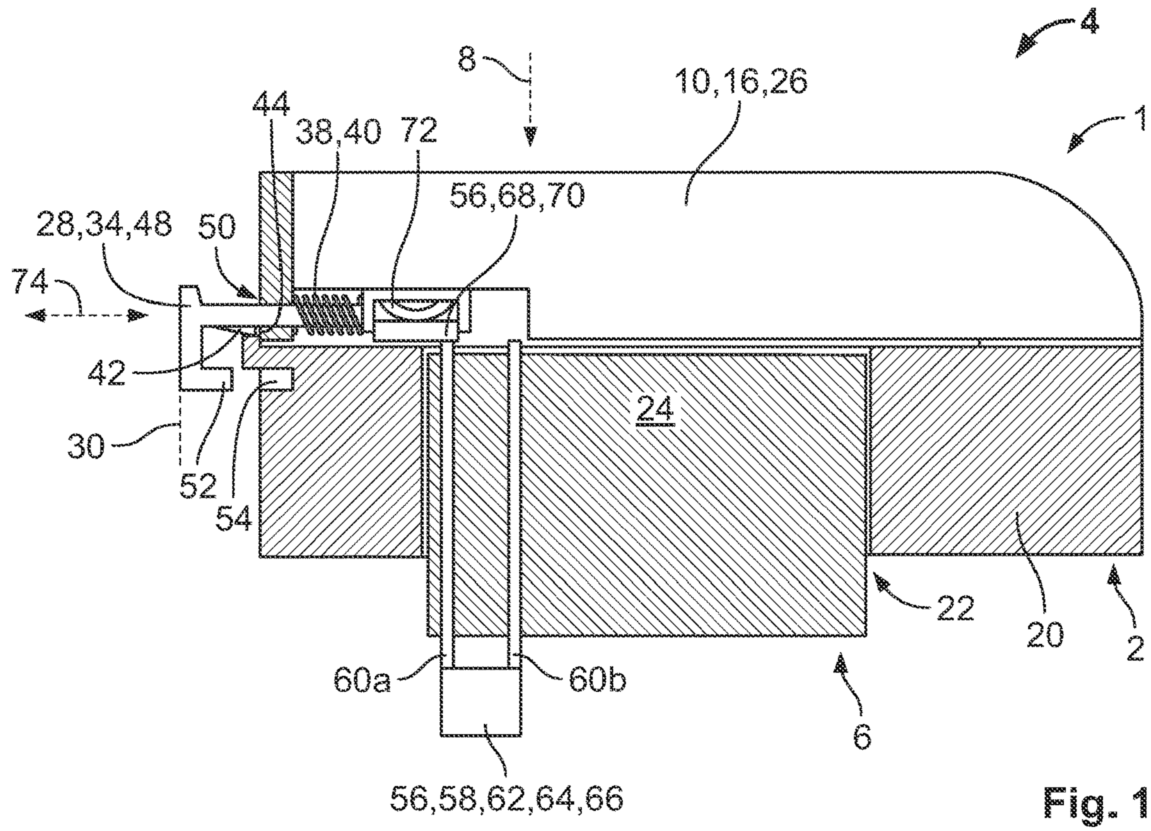
FIG. 1 shows a schematic sectional view of a connector assembly according to a first exemplary embodiment in a side view.
Figure 2:
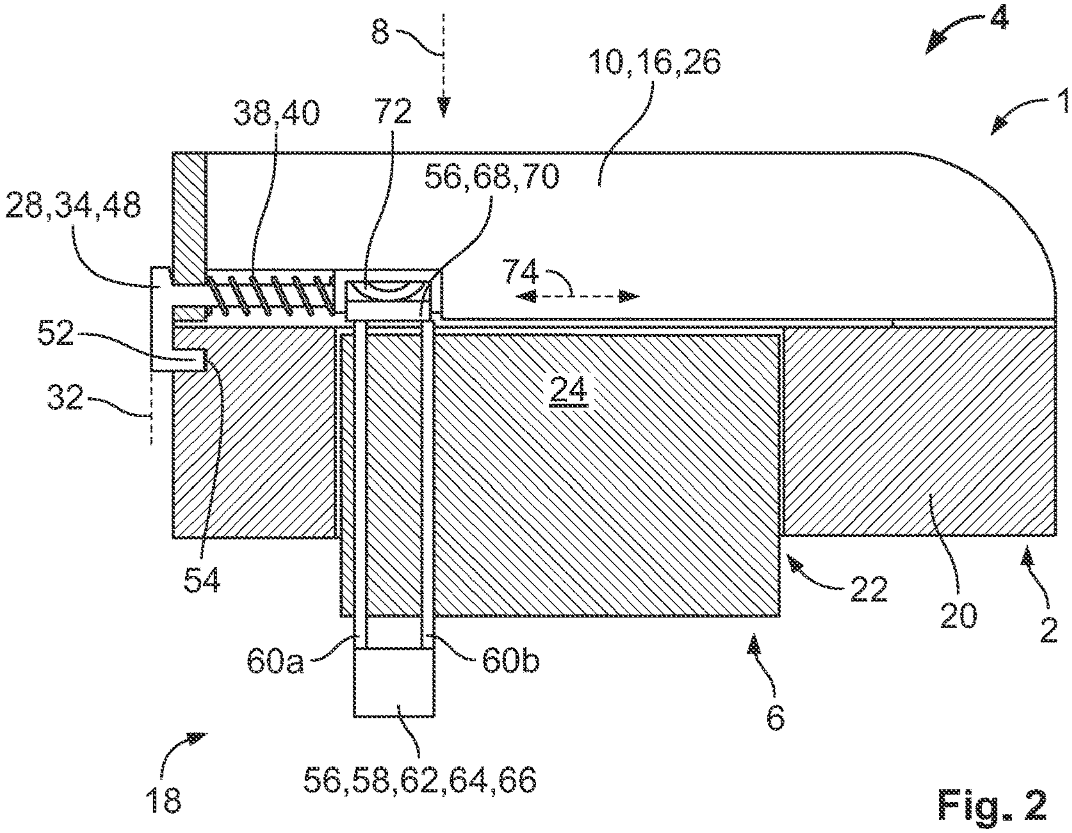
FIG. 2 shows a further schematic sectional view of the connector assembly from FIG. 1.

FIGS. 1 and 2 show an exemplary embodiment of connector assembly 4 which comprises electrical connector 2 and a mating connector 6 which is pluggable with electrical connector 2 along a plugging direction 8. Furthermore, housing assembly 1 for electrical connector 2 is shown in FIGS. 1 and 2.

Figure 3:
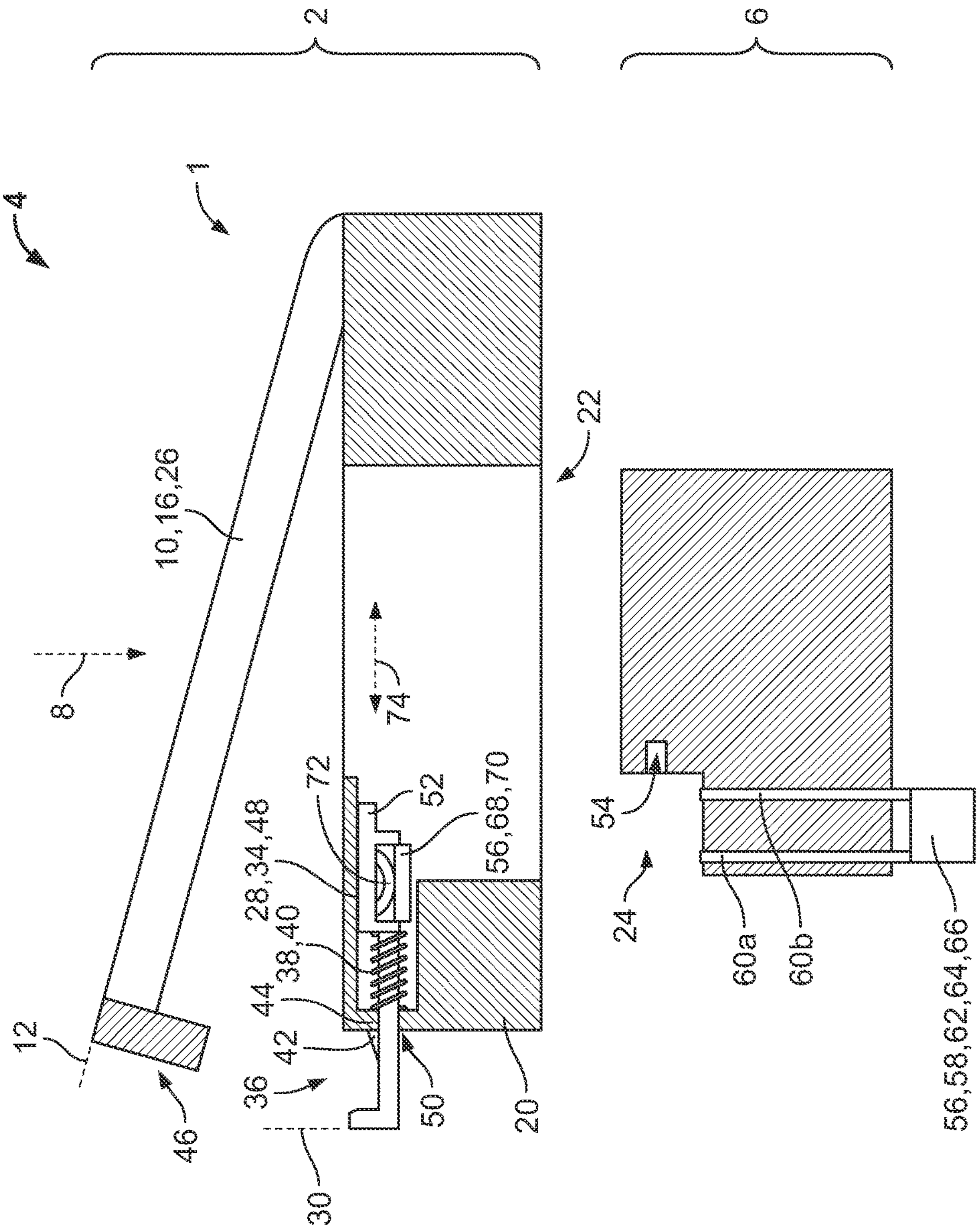
FIG. 3 shows a schematic exploded view of a connector assembly according to a second exemplary embodiment in a sectioned side view.

FIGS. 3 to 6 show a further exemplary embodiment of connector assembly 4. FIG. 3 there shows connector assembly 4 in a separated state so that it can be clearly seen that housing assembly 1 comprises a manually movable operating element 10 for connecting electrical connector 2 to mating connector 6. Operating element 10 is movable between an initial position 12 (see FIG. 3) and a final position 14 (see FIG. 6).

The connection between electrical connector 2 and mating connector 6 is preferably a mechanical connection. Operating element 10 can there be configured as a plugging aid 16 that effects, drives, supports, simplifies, or establishes a plugging process for creating or releasing the connection between electrical connector 2 and mating connector 6.

Operating element 10 can comprise at least one drive section (not shown) that can be made to engage with mating connector 6. The at least one drive section serves to move mating connector 6 to a state 18 that is fully plugged with electrical connector 2 (see FIG. 6) when operating element 10 is moved from initial position 12 to final position 14.

For example, the at least one drive section can be accessible to mating connector 6 in initial position 12 of operating element 10. Furthermore, the at least one drive section can be configured to carry out a drive motion when operating element 10 is transferred from initial position 12 to final position 14. This drive motion can be used to move the mating connector to state 18 fully plugged with the electrical connector.

As shown in FIG. 1, housing assembly 1 can comprises a connector housing 20 with a plugging receptacle 22 pointing in plugging direction 8. Plugging receptacle 22 can be configured to be complementary to a plugging face 24 of mating connector 6. Alternatively, connector housing 20 can also comprise plugging face 24 and mating connector 6 can comprise plugging receptacle 12 configured to be complementary thereto.

Electrical connector 2 comprises at least one electrical contact element which is arranged in connector housing 20. The at least one electrical contact element can be configured to contact a mating contact of mating connector 6. The at least one electrical contact element and the mating contact are not visible in the sectional views of FIGS. 1 to 6 because they are located outside the respective sectional planes.

Operating element 10 is arranged to be movable at connector housing 20. As shown in FIG. 3, operating element 10 can be configured as a control lever 26 arranged to be pivotable at connector housing 20. For this purpose, control lever 26 can comprise at least one bearing hole into which a bearing pin provided on connector housing 20 can be inserted. The bearing pin can be, for example, a cylindrical stub axis that fits into the at least one bearing hole. Control lever 26 can be mounted by way of the at least one bearing hole to be rotatable on the bearing pin. The at least one bearing hole and the bearing pin are not visible in the sectional views of FIGS. 1 to 6 because they are located outside the respective sectional planes.

The at least one drive section can form part of a link guide (not shown) or a gear (not shown), for example, a sprocket segment (not shown). Correspondingly, mating connector 6 can comprise at least one output section (not shown) arranged such that it can be made to engage with the at least one drive section of operating element 10. The at least one output section can be configured, for example, as part of a link guide (not shown) or a gear (not shown), for example, as a rack segment (not shown). The at least one drive section and the at least one output section are not visible in the sectional views of FIGS. 1 to 6 because they are located outside the respective sectional planes.

As part of the plugging process, the at least one drive section of operating element 10 and the at least one output section of mating connector 6 are made to engage. This engagement remains as long as mating connector 6 is disposed in the state plugged together with electrical connector 2. During the engagement, operating element 10 and mating connector 6 are in mechanical operative connection so that they cannot be moved independently of one another.

According to an alternative embodiment, not shown, operating element 10 can be configured as a control slide that is arranged to be slidable at connector housing 20. The control slide is preferably held on connector housing 20 to be slidable transverse to plugging direction 8, in particular perpendicular to plugging direction 8.

Figure 6:
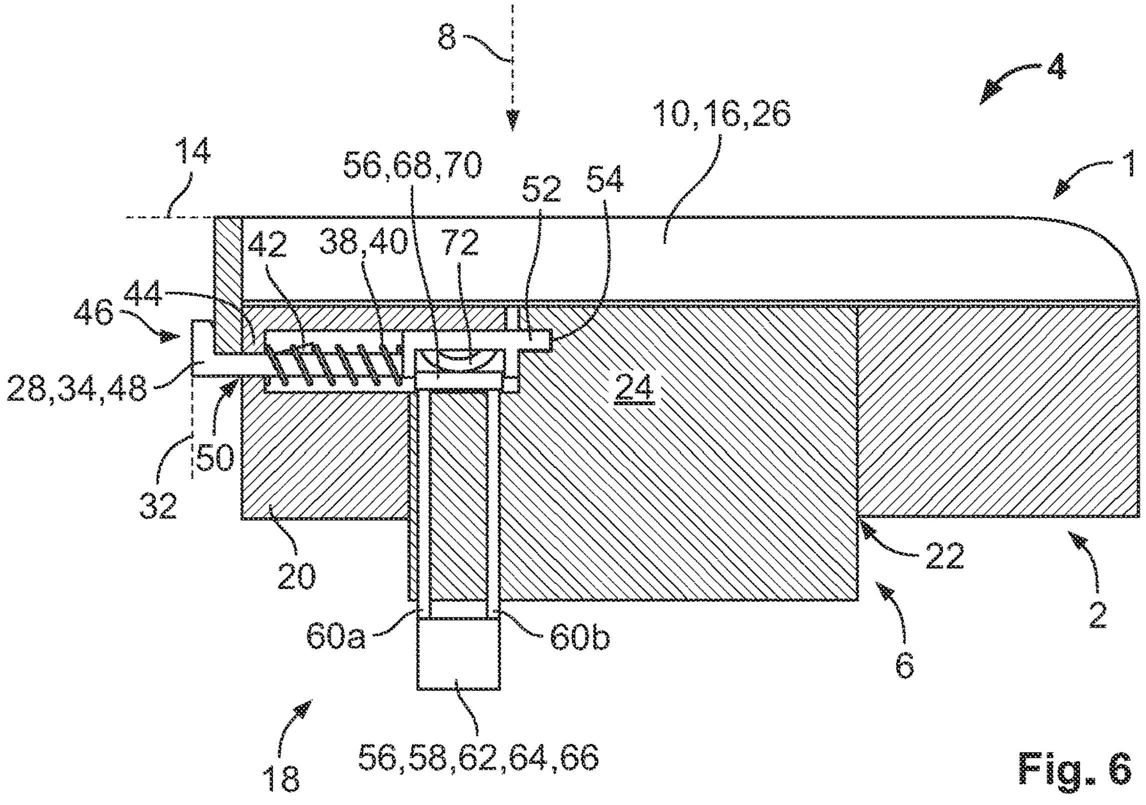
FIG. 6 shows a further schematic sectional view of the connector assembly from FIG. 3.

In addition, housing assembly 1 comprises a securing element 28 which is movable between a release position 30 (see FIG. 3) and a secured position 32 (see FIG. 6). In secured position 32, securing element 28 secures operating element 10 which is disposed in final position 14. Consequently, securing element 28 serves as a CPA element 34 which secures the connection of electrical connector 2 to mating connector 6. In other words, securing element 28 can fulfill the function of a connector position assurance which ensures that a fully plugged state 18 is given and is maintained between electrical connector 2 and mating connector 6.

Operating element 10 there disposed in final position 14 is securable directly or indirectly by securing element 28 disposed in secured position 32. This means that operating element 10 and secured position 32 can engage directly. Alternatively, operating element 10 and securing element 28 can be indirectly in mechanical operative connection already described via the at least one drive section and the at least one output section.

For securing element 28 not needing to be operated manually, i.e. not having to be moved manually from release position 30 to secured position 32, a trigger mechanism 36 is provided which holds securing element 28 in release position 30 pre-stressed in the direction of secured position 32. For this purpose, trigger mechanism 36 can comprise a spring element 38 with which securing element 28 in release position 30 is pre-stressed in the direction of secured position 32. Spring element 38 preferably sits on securing element 28. Furthermore, spring element 38 is arranged subject to pre-stress by tension or pressure between securing element 28 disposed in release position 30 and connector housing 20 (see FIG. 3) or operating element 10 (see FIG. 1). Spring element 38 can be, for example, a coil spring 40. Using a leaf spring (not shown) as spring element 38 is likewise conceivable.

Trigger mechanism 36 is activated by operating element 10 in final position 14, whereby securing element 28 is moved to secured position 32. In other words, securing element 28 is automatically transferred from release position 30 to secured position 32 solely by moving operating element 10 to final position 14.

As shown in FIG. 3, securing element 28 can be part of trigger mechanism 36. For example, securing element 28 can be configured to be latchable in release position 30 with connector housing 20 (see FIG. 3) or operating element 10 (see FIG. 1) using trigger mechanism 36. The latching can there be released by moving operating element 10 to final position 14. Due to the pre-stress of securing element 32 by trigger mechanism 36, securing element 28 is moved from release position 30 to secured position 32 once the latching is released.

The latching can be created in that securing element 28 comprises a deflectable latching section 42, while connector housing 20 or operating element 10 comprises a latching edge 44. Latching edge 44 can be disposed on the outside of connector housing 20 or operating element 10. Latching section 42 is deflectable preferably in an elastic and non-destructive manner. For this purpose, latching section 42 is more flexible in terms of its shape and material properties than the remainder of securing element 32. If repeatability is not intended or can even be ruled out, then latching section 42 can also be deflected plastically and with permanent deformation.

Latching section 42 abuts flush against latching edge 44 when securing element 28 is disposed in release position 30 and operating element 10 is disposed in initial position 12. When securing element 28 is disposed in release position 30 and operating element 10 in final position 14, then latching section 42 is deflected out of alignment with latching edge 44 by connector housing 20 or operating element 10.

Trigger mechanism 36 is preferably activated by a free end 46 of control lever 26 pointing away from connector housing 20 when securing element 28 is disposed in release position 30 and control lever 26 in final position 14. In particular, latching section 42 is deflected away from latching edge 44 by free end 46 of control lever 26

In the embodiment shown in FIGS. 3 to 6, securing element 28 is moved by a translation between release position 30 and secured position 32. In particular, securing element 28 can be configured as a slide 48. Alternatively or additionally, securing element 28 can be movable by a rotation between release position 30 and secured position 32. For example, securing element 28 can be configured as a rocker (not shown).

Securing element 28 configured as a slide 48 can be guided at least in sections in or at connector housing 20 (see FIG. 3). Securing element 28 can also be guided in or at operating element 10 (see FIG. 1). Furthermore, securing element 28 can be movable with and relative to operating element 10 or connector housing 20. In addition, connector housing 20 or operating element 10 can be penetrated by securing element 28 at least in sections. For example, connector housing 20 or operating element 10 can comprise at least one channel-shaped guide 50 into which the securing element 28 is plugged at least in sections.

As shown in FIG. 3, securing element 28, in particular latching section 42 of securing element 32, can protrude at least in part out from connector housing 20 when securing element 28 is disposed in release position 30 and operating element 10 in initial position 12. Securing element 28, in particular latching section 42 of securing element 32, is therefore arranged to be easily accessible to operating element 10 for the purpose of activating trigger mechanism 36.

According to an embodiment not shown, housing assembly 1 can comprise a collar, a cage, or a wall. The collar can there surround at least in sections securing element 28 protruding out from connector housing 20. In particular, the collar surrounds securing element 28 such that latching section 42 of securing element 32 is accessible to operating element 10. This can prevent faulty activation of the trigger mechanism due to unwanted contact.

Securing element 28 disposed in secured position 32 preferably projects at least in part into plugging receptacle 22. In particular, securing element 28 projects further into plugging receptacle 22 in secured position 32 than in release position 30. The securing element can therefore be made to engage with mating connector 6, in particular with plugging face 24 of mating connector 6, provided that electrical connector 2 and mating connector 6 are in the fully plugged state.

Figure 4:
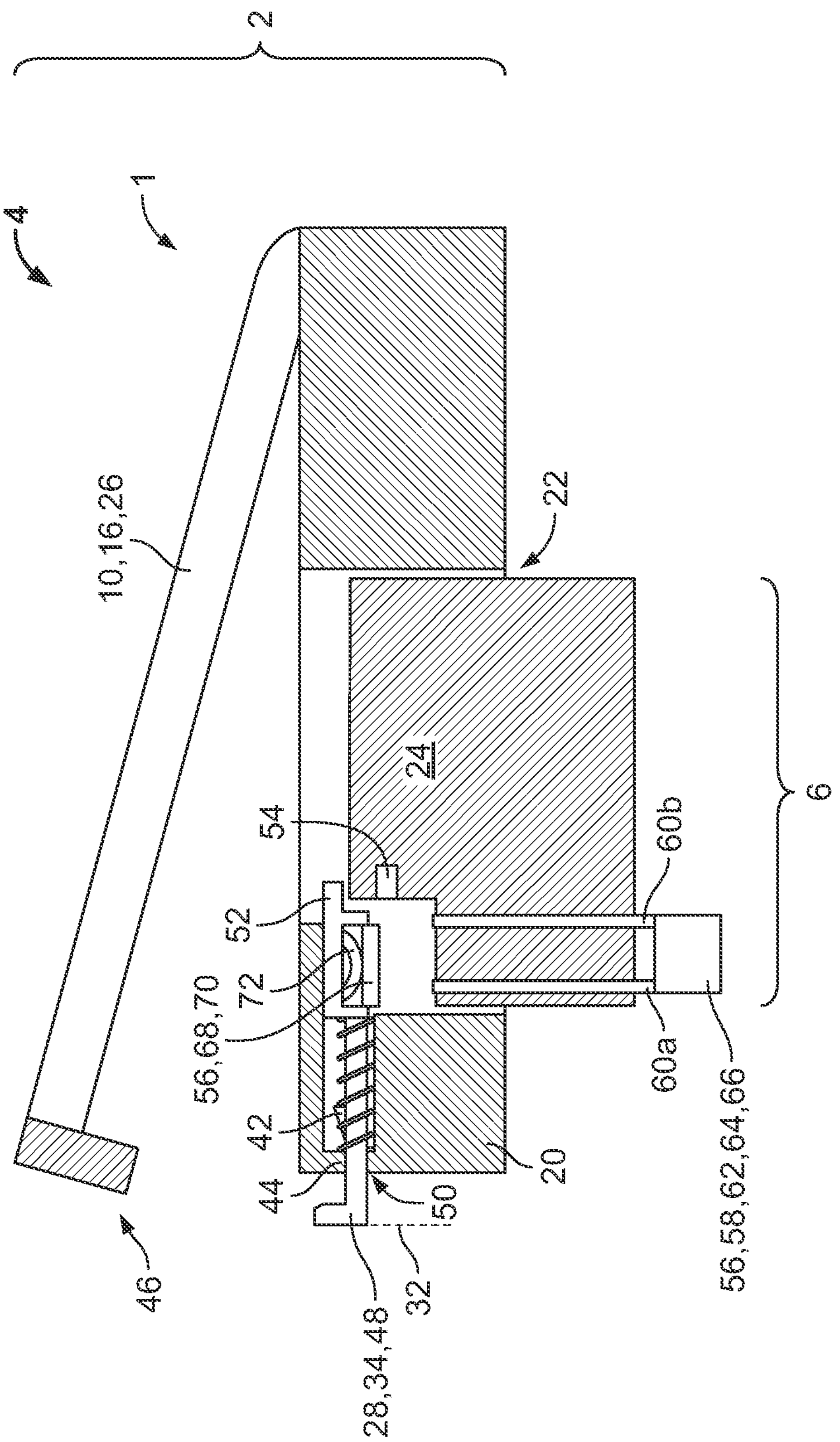
FIG. 4 shows a further schematic sectional view of the connector assembly from FIG. 3.

In FIG. 4, electrical connector 2 and mating connector 6 are shown in a state of being plugged together at least in part. FIG. 4 there illustrates a further function of securing element 32. In the event that securing element 28 reaches secured position 32 prematurely, for example, for the reason that trigger mechanism 36 was activated accidentally, securing element 28 protruding into plugging receptacle 22 can block plugging receptacle 22. This prevents electrical connector 2 and mating connector 6 from being fully plugged together.

Figure 5:
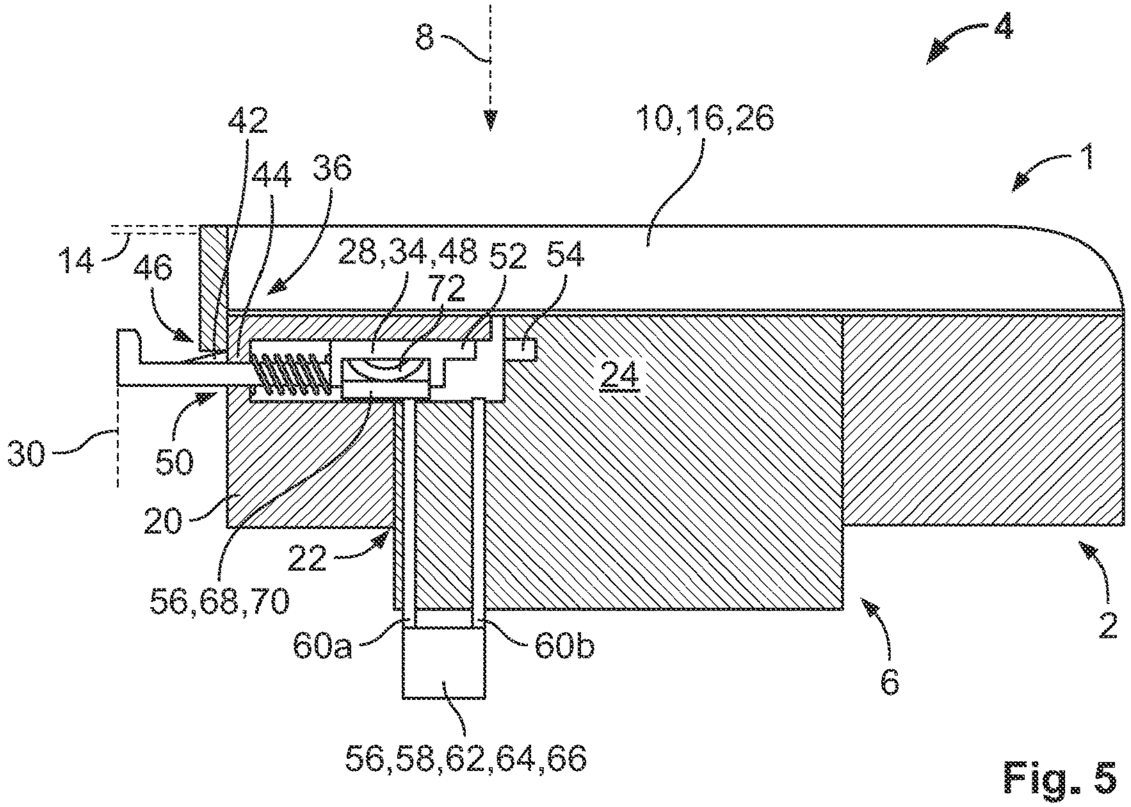
FIG. 5 shows a further schematic sectional view of the connector assembly from FIG. 3.

If securing element 28 is not disposed in secured position 32, then electrical connector 2 and mating connector 6 can be fully plugged together with the aid of operating element 10. For this purpose, operating element 10 is moved manually from initial position 12 to final position 14. FIG. 5 shows the state shortly before operating element 10 reaches final position 14. It can be clearly seen that free end 46 of control lever 26 is about to deflect latching section 42 away from latching edge 44.

In the illustration of FIG. 6, operating element 10 has reached final position 14 and there deflected latching section 42 away from latching edge 44. As a result, spring element 38 has relaxed and thereby moved securing element 28 from release position 30 to secured position 32. Due to its elasticity, latching section 42 has assumed its original position, but is no longer in abutment with latching edge 44 due to the spring-induced sliding.

Instead, securing element 28 now engages with mating connector 6 without securing element 28 itself having had to be operated manually. In other words, securing element 28 automatically reaches secured position 32 in which securing element 28 fulfills the position assurance of mating connector 6.

For example, securing element 28 can comprise a locking section 52 for this purpose and mating connector 6 a recess 54 which is shaped to be complementary to locking section 52. Locking section 52 can protrude transverse to plugging direction 8, in particular perpendicular to plugging direction 8. Recess 54 which is complementary thereto extends accordingly transverse, in particular perpendicular to plugging direction 8. Locking section 52 and recess 54 are arranged relative to one another such that they engage when securing element 28 is disposed in secured position 32 and mating connector 6 in state 18 fully plugged with electrical connector 2.

As shown in FIGS. 1 and 2, recess 54 can also be arranged at connector housing 20 of electrical connector 2 instead of at mating connector 6. In this embodiment, it is advisable to guide securing element 28 at operating element 10.

During a separation process of electrical connector 2 from mating connector 6, operating element 10 is accordingly transferred back from final position 14 to initial position 12, where securing element 28 is moved in advance manually from secured position 32 to release position 30. The engagement between locking section 52 and recess 54 is thus released and the separation process is made possible. When securing element 28 is again in release position 30, latching section 42 can possibly latch again at latching edge 44.

As shown in FIGS. 1 to 6, connector assembly 4 can comprise an electrical control system 56. Electrical control system 56 is preferably distributed over electrical connector 2 and mating connector 6 and is used to automatically detect the presence and absence of fully plugged state 18 between electrical connector 2 and mating connector 6. Electrical control system 56 ensures in particular that the main circuit (i.e. the circuit that leads over the at least one electrical contact element of electrical connector 2) can only be switched on as long as mating connector 6 is in a state 18 fully plugged with electrical connector 2. This prevents the occurrence of electric shock and arc discharge.

For this purpose, mating connector 6 can comprise an open monitoring circuit 58. In particular, two spaced contacts 60*a*, 60*b* of monitoring circuit 58 can be arranged accessible, in particular exposed, at plugging face 24 of mating connector 6. Monitoring circuit 58 can be, for example, part of a high-voltage interlock system 62, a high-voltage interlock loop 64, or an HVIL detection device 66 (HVIL=high voltage interlock loop). High-voltage interlock system 62 can in turn be configured such that the main circuit can only be put into operation when monitoring circuit 58 is closed.

Securing element 28 can comprise an electrically conductive section 68 for closing monitoring circuit 58. Electrically conductive section 68 can protrude into plugging receptacle 22 when securing element 28 is in secured position 32 (see FIG. 6). In particular, electrically conductive section 68 projects further into plugging receptacle 22 in secured position 32 than in release position 30.

For example, securing element 28 can hold a contact bridge 70 made of electrically conductive material and forming electrically conductive section 68. Contact bridge 70 is arranged on securing element 28 such that it closes monitoring circuit 58 when securing element 28 is disposed in secured position 32 and mating connector 6 is in state 18 fully plugged with electrical connector 2. In particular, contact bridge 70 short-circuits two contacts 60*a*, 60*b* of monitoring circuit 58 when securing element 28 is disposed in secured position 32 and mating connector 6 in state 18 fully plugged with electrical connector 2.

In order to ensure sufficient contacting force when short-circuiting two contacts 60*a*, 60*b* of monitoring circuit 58, contact bridge 70 can be held pre-stressed in securing element 28. For example, contact bridge 70 can be pre-stressed transverse, in particular perpendicular, to direction of motion 74 of securing element 32 by a leaf spring 72. Optionally, two contacts 60*a*, 60*b* of monitoring circuit 58 can be configured as spring contact pins (not shown).

According to an embodiment not shown, contact bridge 70 and leaf spring 72 can be made of one and the same component. Spring element 38 can also belong to this component.

According to a further embodiment, not shown, securing element 28 can comprise a magnetic section in addition to or as an alternative to electrically conductive section 68. For example, securing element 28 can hold a magnet (not shown), in particular a permanent magnet. Accordingly, mating connector 6 can comprise a magnetic sensor (not shown), for example, a reed switch.

The magnet and the magnetic sensor are arranged relative to one another such that they are aligned, in particular aligned in plugging direction 8, when securing element 28 is disposed in secured position 32 and mating connector 6 in state 18 fully plugged with electrical connector 2. Control system 56 can therefore be configured to release the main circuit only when the magnetic field of the magnet is detected by the magnetic sensor.

Connector housing 20, operating element 10, and securing element 28 can each be an injection molded member, in particular a plastic injection molded member.

The invention claimed is:

1. A housing assembly for an electrical connector that is pluggable with a mating connector, comprising:
- a manually movable operating element for connecting said electrical connector to said mating connector,
- a connector housing at which said operating element is arranged to be movable between an initial position and a final position,
- a securing element which is movable between a release position and a secured position, and
- a trigger mechanism which holds said securing element in said release position pre-stressed in the direction of said secured position,
- wherein said trigger mechanism is activated in said final position of said operating element and said securing element is movable to said secured position, whereby said operating element is securable in said final position.

2. The housing assembly according to claim 1, wherein said securing element is part of said trigger mechanism and is moved by said operating element from said release position to said final position.

3. The housing assembly according to claim 1, wherein said securing element is configured in said release position to be latchable to said connector housing or said operating element via said trigger mechanism and this latching can be released by moving said operating element to said final position.

4. The housing assembly according to claim 1, wherein said securing element comprises a deflectable latching section, wherein said connector housing or said operating element comprises a latching edge, wherein said latching section abuts against said latching edge when said securing element is disposed in said release position and said operating element is disposed in said initial position, and wherein said latching section can be deflected away from said latching edge by said connector housing or said operating element when said securing element is disposed in said release position and said operating element in said final position.

5. The housing assembly according to claim 1, wherein said operating element is configured as a control lever arranged to be pivotable at said connector housing, and wherein said trigger mechanism is activated by a free end of said control lever when said securing element is disposed in said release position and said control lever in said final position.

6. The housing assembly according to claim 1, wherein said securing element is movable by one of translation or rotation between said release position and said secured position.

7. The housing assembly according to claim 1, wherein said securing element is guided at least in sections in or at said connector housing or said operating element.

8. The housing assembly according to claim 1, wherein said securing element comprises at least one of a magnetic section and an electrically conductive section.

9. The housing assembly according to claim 1, wherein said securing element protrudes at least in part out from said connector housing when said securing element is disposed in said release position and said operating element in said initial position.

10. The housing assembly according to claim 9, wherein said housing assembly comprises a collar which surrounds at least in sections said securing element protruding out from said connector housing.

11. An electrical connector comprising:
- a housing assembly including a manually movable operating element for connecting said electrical connector to a mating connector, said housing assembly including a connector housing at which said operating element is arranged to be movable between an initial position and a final position, said housing assembly including a securing element which is movable between a release position and a secured position, and said housing assembly including a trigger mechanism which holds said securing element in said release position pre-stressed in the direction of said secured position, wherein said trigger mechanism is activated in said final position of said operating element and said securing element is movable to said secured position, whereby said operating element is securable in said final position; and
- at least one electrical contact element arranged in said connector housing.

12. The electrical connector of claim 11, wherein said securing element is part of said trigger mechanism and is moved by said operating element from said release position to said final position.

13. The electrical connector of claim 11, wherein said securing element is configured in said release position to be latchable to said connector housing or said operating element via said trigger mechanism and this latching can be released by moving said operating element to said final position.

14. The electrical connector of claim 11, wherein said securing element comprises a deflectable latching section, wherein said connector housing or said operating element comprises a latching edge, wherein said latching section abuts against said latching edge when said securing element is disposed in said release position and said operating element is disposed in said initial position, and wherein said latching section can be deflected away from said latching edge by said connector housing or said operating element when said securing element is disposed in said release position and said operating element in said final position.

15. The electrical connector of claim 11, wherein said operating element is configured as a control lever arranged to be pivotable at said connector housing, and wherein said trigger mechanism is activated by a free end of said control lever when said securing element is disposed in said release position and said control lever in said final position.

16. The electrical connector of claim 11, wherein said securing element is movable by one of translation or rotation between said release position and said secured position.

17. A connector assembly comprising:
- an electrical connector including a housing assembly including a manually movable operating element for connecting said electrical connector to a mating connector, said housing assembly including a connector housing at which said operating element is arranged to be movable between an initial position and a final position, said housing assembly including a securing element which is movable between a release position and a secured position, and said housing assembly including a trigger mechanism which holds said securing element in said release position pre-stressed in the direction of said secured position, wherein said trigger mechanism is activated in said final position of said operating element and said securing element is movable to said secured position, whereby said operating element is securable in said final position, said electrical connector including at least one electrical contact element arranged in said connector housing; and a mating connector configured to be pluggable with said electrical connector, wherein said securing element can be made to engage with said mating connector when said securing element is disposed in said secured position and said mating connector is disposed in said state plugged together with said electrical connector.

18. The connector assembly according to claim 17, wherein said securing element comprises a locking section, wherein said mating connector comprises a recess which is shaped to be complementary to said locking section, and wherein said locking section and said recess engage when said securing element is disposed in said secured position and said mating connector is disposed in said state plugged together with said electrical connector.

19. The connector assembly according to claim 17, wherein said mating connector comprises an open monitoring circuit and said securing element comprises a contact bridge which closes said monitoring circuit when said securing element is disposed in said securing position and said mating connector is disposed in said state plugged together with said electrical connector.

20. The connector assembly according to claim 17, wherein said mating connector comprises a magnetic sensor and said securing element comprises a magnet which is in flush alignment with said magnetic sensor when said securing element is disposed in said secured position and said mating connector is disposed in said state plugged together with said electrical connector.

* * * * *